March 1, 1927.
E. NELSON
1,619,750
BEAM COMPASS
Filed April 16, 1926
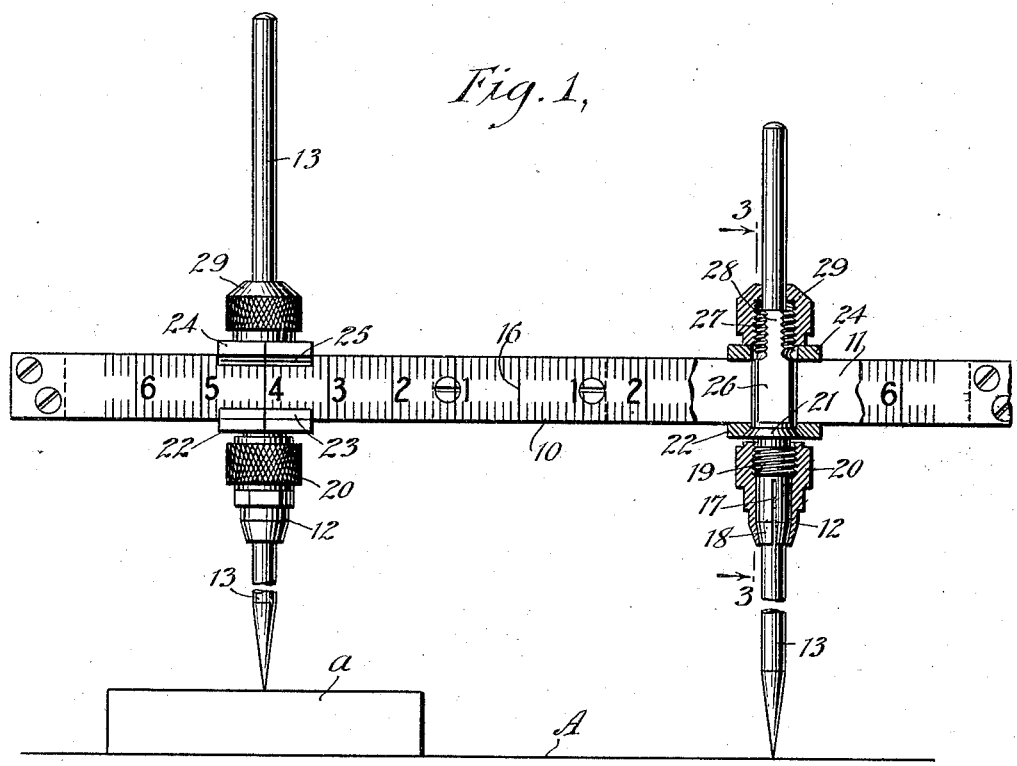
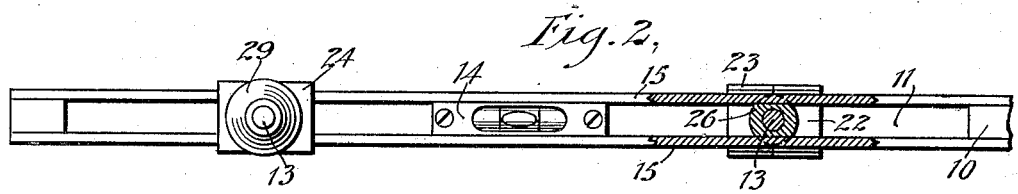
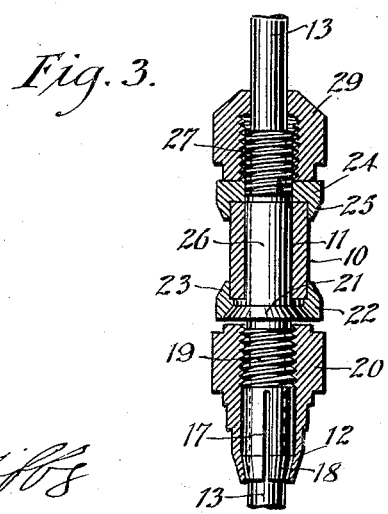
WITNESSES
Edw. Thorpe
J. Lancliffs
INVENTOR
Emil Nelson
BY Munn Co
ATTORNEYS Patented Mar. 1, 1927.

1,619,750

UNITED STATES PATENT OFFICE.

EMIL NELSON, OF GARY, INDIANA.

BEAM COMPASS.

Application filed April 16, 1926. Serial No. 102,513.

My invention relates to a beam compass and has for its general object to provide a beam compass in which the points or spindles are individually adjustable vertically, that is to say, transversely of the beam so that the points may be positioned on two surfaces at different levels and with the beam parallel with said surfaces, thereby overcoming the necessity of disposing the beam obliquely to the surfaces on which a piece of work is being laid out. Obviously, when the beam is oblique, as when the surfaces on which the work is being laid out with the center of the work indicated by a line appearing on a face of the beam, accuracy of measurement is not readily attainable. However, with the beam parallel with the surfaces on which the work is laid out and with the center line or neutral point perpendicular to the said surfaces, accuracy of measurement is insured.

A further object of the invention is to provide a beam compass with the beam graduated in opposite directions and with unit measurements indicated at opposite sides of the center so that the respective spindles or points may be accurately positioned equidistant from the center line.

The invention also has for an object to provide a beam compass with a level to aid in the leveling of the compass parallel with the work.

More specifically, the invention has for an object to provide a chuck and clamp means for each spindle which will insure the ready and secure holding of the spindles in predetermined relative adjustment.

The nature of my invention and its distinguishing features and advantages will clearly appear as the description proceeds.

Reference is to be had to the accompanying drawings forming a part of this specification it being understood that the drawings are merely illustrative of one example of the invention.

Figure 1 is a side elevation of a beam compass embodying my invention with the chuck for adjustably holding one of the points or spindles in vertical section;

Figure 2 is a plan view with parts broken away and in section;

Figure 3 is an enlarged vertical section on the line 3—3, Figure 1.

The illustrated example of my invention includes a beam 10 presenting a longitudinal slot 11 in which slot chucks 12 are slidable longitudinally of the beam 10. Said chucks afford through-bores for the spindles 13.

It will be observed from Figure 2 that a level 14 is incorporated in the beam 10, flush with, or below the top surface of the beam 10. Said beam 10 in the illustrated form includes two side plates 15 between which the level 14 is fitted. It is to be noted, comparing Figures 1 and 2, that the level is centrally located so that the air bubble moves across the center or neutral line 16, see Figure 1.

The chucks 12 have slots 17 at the gripping end of the chuck and a beveled terminal 18 at the forward end of the slot 17 as is usual in tools of this general character.

Each chuck is formed also with a threaded zone 19 to be engaged by a clamp nut 20 fitting the slotted end of the chuck. Each chuck furthermore is formed with a beveled annular flange or bevelled collar 21 adjacent the threaded zone 19.

At the under side of the beam, the chuck is provided with a clamp element 22 having side flanges 23 lying at each side of the beam 10. Said clamp element 22 has a bevelled counter-bore conforming to the bevel of the collar 21. On the beam at the upper side is a coacting clamp element 24 having flanges 25 overlapping the side surfaces of the beam 10 and having a bore through which the shank 26 of the chuck 12 passes. The upper terminal of the chuck 12 is formed with a thread 27, said thread being mutilated by oppositely disposed flattened sides 28 which are continuous with the flattened sides of shank 26 which conform to the slot 11 of the beam to prevent turning of the chuck 12. The threaded zone 27 receives a cap nut 29 bored for the passage of the spindle 13.

The beam 10 is calibrated on the sides as clearly shown in Figure 1 and the divisions of the calibrated surfaces are indicated by the numerals 1, 2, 3, etc., the indicating numerals being in corresponding positions at opposite sides of the central or neutral line 16. Thus, each spindle is readily positioned along the beam 10 equidistant from the central line 16 that measurements may be accurately indicated.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim.

1. In a beam compass, a beam, and points disposed along said beam, and chucks for said points, longitudinally adjustable along the beam toward and from each other to vary the distance between the points, each of said chucks including a clamping terminal, a shank integral with the clamping terminal and adapted to receive a point, clamp members on said shank above and below the beam, and means to engage said clamp members firmly with the beam for holding the points in adjusted positions along the beam.

2. In a beam compass, a beam, points adapted to engage surfaces in laying out a piece of work, and chucks one for each point, with the point extending therethrough, said chucks each having a flattened shank and a clamping terminal to hold a point, clamp members above and below the beam, and a nut having threaded engagement with said shank to draw the clamp members into firm engagement with the beam or to release the clamp members.

3. In a beam compass, a beam, points adapted to engage surfaces in laying out a piece of work, and chucks one for each point, with the point extending therethrough, said chucks each having a flattened shank and a clamping terminal to hold a point, clamp members above and below the beam, and a nut having threaded engagement with said shank to draw the clamp members into firm engagement with the beam or to release the clamp members, the lower one of said clamp members having a countersunk opening through which said shank extends and said shank having a bevelled collar conforming to the countersink of said clamp member.

EMIL NELSON.